INVENTOR
J. L. FLANAGAN
BY G. E. Hirsch Jr.
ATTORNEY

United States Patent Office 3,428,748

Patented Feb. 18, 1969

3,428,748

VOWEL DETECTOR

James L. Flanagan, Warren Township, Somerset County, N.J., assignor to Bell Telephone Laboratories, Incorporated, New York, N.Y., a corporation of New York Filed Dec. 28, 1965, Ser. No. 517,004

U.S. Cl. 179—1 8 Claims

Int. Cl. H04m *1/24*

ABSTRACT OF THE DISCLOSURE

Vowel sounds are indicated by extracting from the speech wave a selected number of formants, generating an artificial vowel spectrum in the form of a complex wave with its maxima occurring at the formant frequencies of the speech wave, and comparing at each formant frequency, the actual amplitude of the speech wave with the specially created amplitude of the vowel spectrum wave using the difference between the two to indicate a vowel or a nonvowel.

This invention relates to the automatic recognition of human speech sounds and in particular to the detection and segmentation of vowel sounds in running speech.

Studies of the mechanism by which speech sounds are produced indicate that one speech sound is distinguished from another primarily by the frequencies at which the sound's energy is concentrated. Thus each speech sound can in theory be described by a graph of the amplitude of each frequency component in the sound versus time. Such graphs are called spectrograms.

In the past, much attention has been given to obtaining representative spectrograms of each speech sound from a large number of people with a view toward the implementation of an automatic speech recognition system. Such a device would merely divide spoken words or sentences into their basic speech sounds, determine the spectrogram of each speech sound, match this spectrogram to one of a plurality of reference spectrograms and print a series of reference symbols corresponding to the reference spectrograms so derived. In practice, the accurate operation of such a system is made difficult and, according to some experts, impossible by the wide variation in the characteristics of the spectrograms generated by a large number of people speaking the same speech sound, by the variation of the spectrogram of a sound in different contexts, by the difficulty and uncertainty in determining the time boundaries between adjacent speech sounds, and by the similarities in the spectrograms of different speech sounds.

Despite the difficulty in finding a unique and reliable representation for each speech sound, vowel sounds as a class have spectrograms which are distinctly different from the spectrograms of all other speech sounds. In particular, acoustical theory shows that, for the production of vowel sounds, a systematic and unique relationship must exist between the frequencies of the vocal tract resonances and the maximum amplitudes or "formants" of the vowel frequency spectrum. The amplitudes of these formants relative to each other are unique to vowels; that is, no other speech sounds possess formants with the same relative magnitudes as the vowel formants.

The present invention turns to account the unique relation between the relative amplitudes of the first three or four vowel formants and their frequencies. According to the invention, the presence or absence of a vowel is determined by comparing a selected set of a spoken sound's measured formant amplitudes with a simulated set of vowel formant amplitudes synthesized at the frequencies of the measured formants in a precisely chosen model of the vocal tract. If the differences between the synthesized and measured formant amplitudes are less than certain selected values, the spoken sound is considered to be a vowel, whereas if these differences exceed the selected values, the spoken sound is considered to be a nonvowel.

More particularly, in accordance with the invention, an incoming speech signal's formant amplitudes and frequencies are continuously measured in an analyzer, and signals representative of the formant amplitudes are stored in a comparison and decision network. Several parallel-connected oscillators are controlled to oscillate at the measured formant frequencies, and their summed output signals are used to drive several series-connected resonance circuits controlled to resonate at the formant frequencies. The output signal from the resonance circuits is passed through several parallel-connected bandpass filters to generate a set of signals which, when rectified and averaged, represent a set of synthesized vowel formant amplitudes at the measured formant frequencies. The synthesized vowel formant amplitudes are weighted by a selected amount and compared to the set of measured formant amplitudes. If the differences between the two sets of formant amplitudes are less than preselected amounts, the spoken sound is determined to be a vowel; otherwise it is a nonvowel.

This invention will be more fully understood from the following detailed description of an illustrative embodiment thereof taken in conjunction with the figures where FIG. 1 is a schematic block diagram of apparatus utilizing the principles of this invention;

*Mathematical foundations*

Before presenting a description of the preferred apparatus embodying the principles of this invention, the mathematical relation on which it is based will be briefly explained. A detailed derivation of the relation is given in Chapter III of J. L. Flanagan's book "Speech Analysis, Synthesis and Perception," Academic Press (1965). As described on page 52 of the above cited book, the transmission properties of the vocal tract during the production of vowel sounds can be represented by the following equation.

$$H(s)=\frac{U_m}{U_g}\cong\prod_{n=0}^{\infty}\frac{s_n s_n^*}{(s-s_n)(s-s_n^*)} \qquad (1)$$

In this equation, $H(s)$ is the vocal tract "transfer function" which partly determines the "envelope" or shape of the vowel frequency spectrum, $U_m$ is the complex frequency or Laplace transform of the volume flow rate of air from the vocal tract through the mouth and $U_g$ is the complex frequency or Laplace transform of the volume flow rate of air through the opening between the vocal cords, called the glottis, into the vocal tract. The terms $s_n$ and $s_n^*$ are the "poles" or complex resonant frequencies of the vocal tract and the asterisk denotes the complex conjugate frequency. The variable $s$ represents the complex frequencies at which the vocal tract is "driven" or excited by air from the lungs. In general the complex frequencies can be represented as $s=\sigma+j\omega$ and $s_n=\sigma_n+j\omega_n$ where $\sigma$ is the real value and $j\omega$ the imaginary value of the complex frequency $s$. In particular, it should be noticed that when $s\cong s_n$, Equation 1 goes through a maximum, and that at no finite excitation frequency $s$ does Equation 1 go to zero. The effect of this lack of "zeros" in Equation 1 on the frequency spectrum of a vowel sound will be made clearer by a brief analysis of Equation 1 using the complex plane shown in FIG. 2.

Figure 2:
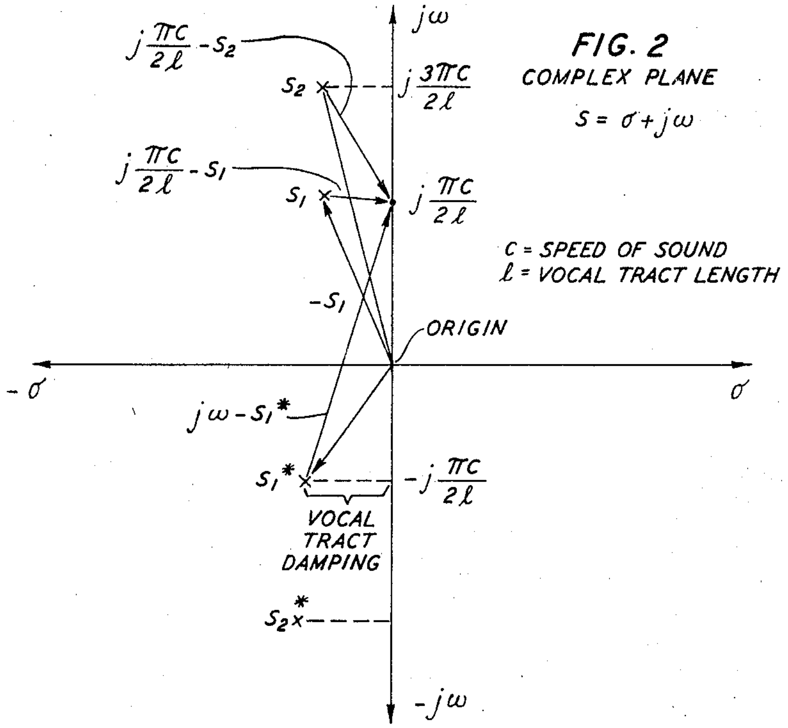
FIG. 2 is useful in explaining the mathematical basis of this invention.

FIG. 2 shows the complex plane containing the complex frequencies, $s_n$, and the complex conjugate frequencies $s_n^*$, called "poles," at which resonance occurs. From FIG. 2 it can be seen that for frequencies $s=j\omega$, the formants or maxima in the voice spectrum occur at approximately the frequencies $s=\pm j\omega_n$. That is, for $s=j\omega$ the function of Equation 1 has greatest magnitude $|H(j\omega)|$ at the frequencies $\omega_n$.

It should also be noted that there is no finite excitation frequency $s$ at which the vocal tract's vowel transfer function $U_m/U_g$ goes to zero. This absence of "zeros" in the numerator of the vocal tract transfer function is a particular property of vowel sounds. An examination of FIG. 2 shows that the existence of transfer function zeros in the areas of the lower formant frequencies, that is, in the vicinity of the first few poles $s_n$, would lower the magnitude of the transfer function at the lower vocal tract resonances.

Figure 3A:
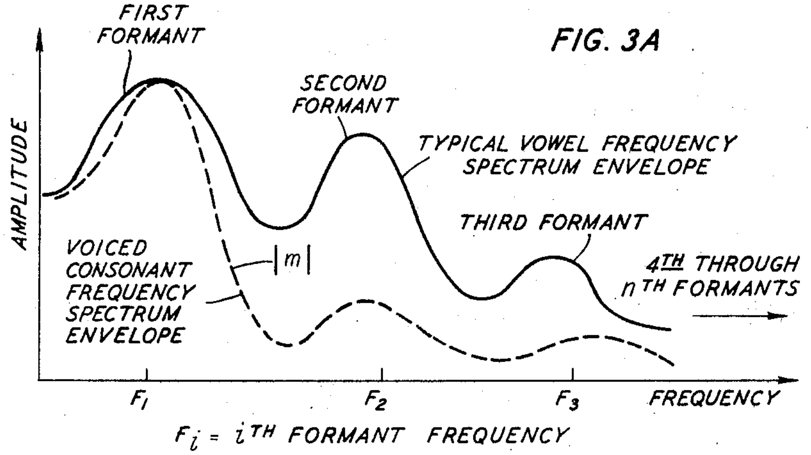
FIGS. 3A and 3B show typical frequency spectra for vowels and nonvowels.
Figure 3B:
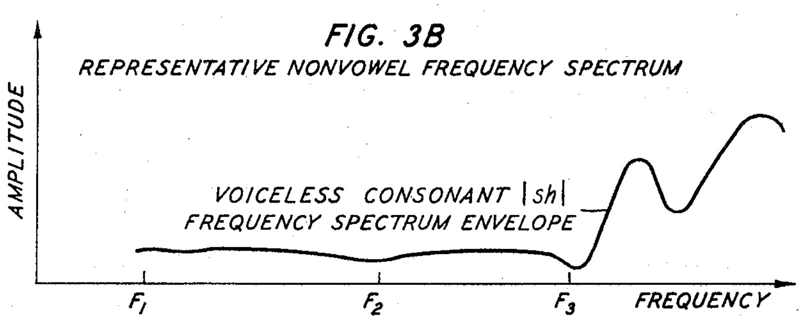

Typical vowel and nonvowel frequency spectrum envelopes are shown in FIGS. 3A and 3B respectively to illustrate this point. FIG. 3A shows, as a solid line, a typical vowel frequency spectrum. Three formant frequencies, $F_1$, $F_2$, and $F_3$, are shown. The vowel frequency spectrum possesses clearly defined maxima at these formant frequencies. The formant amplitudes decrease at a rate of approximately six db per octave reflecting the fact that the vocal cord excitation signal has a frequency spectrum which decreases at approximately 12 db per octave while the radiation resistance from the mouth rises at approximately six db per octave. Thus the net change per octave in the vowel frequency spectrum is a decrease of approximately six db per octave. FIG. 3A shows in dashed lines for comparison purposes the frequency spectrum of a typical voiced nasal consonant. The voiced consonant's amplitude at the first vowel formant frequency is equated to the amplitude of the first vowel formant to emphasize the fact that it is only the relative vowel formant amplitudes which are unique. A nasal consonant normally has a pole-zero pair between the first and second vowel formants and thus the amplitudes of the voiced consonant's frequency spectrum at the second and third formant frequencies are considerably less than the corresponding vowel formant amplitudes.

The nonvowel spectrum shown in FIG. 3B represents a typical voiceless consonant and usually has much smaller values than the vowel spectrum at the frequencies $F_1$, $F_2$, and $F_3$ of the first three vowel formants. An analysis of the vocal tract during the production of voiceless nonvowels shows that this depression in the nonvowel spectrum is caused partly by the existence of low frequency zeros in the nonvowel transfer function and partly by the relatively small amount of excitation energy in the lower part of the nonvowel frequency spectrum as compared to the upper part of this frequency spectrum. Indeed the nonvowel spectrum shown has a zero at approximately $F_3$, the frequency of the third vowel formant, thus depressing the nonvowel frequency spectrum in the region of $F_3$. The necessary analyses to develop the nonvowel transfer functions are carried out in Chapters 3 and 6 of the above cited book.

It has been discovered that the lack of low frequency zeros in the vocal tract's vowel transfer function allows vowels to be distinguished from nonvowels. In accordance with the invention, this is done by comparing the amplitudes of a set of the first few formants of a spoken sound with the amplitudes of a corresponding set of reference vowels. The set of reference vowel formants are derived from a carefully selected model of the vocal tract configuration during the production of vowels. One such model of the vocal tract employs several series-connected resonance circuits isolated from each other by unity gain amplifiers and is based on the equivalence of the vocal tract's vowel transfer function given by Equation 1 and the transfer function of such a series-connected circuit.

*Apparatus*

Figure 1:
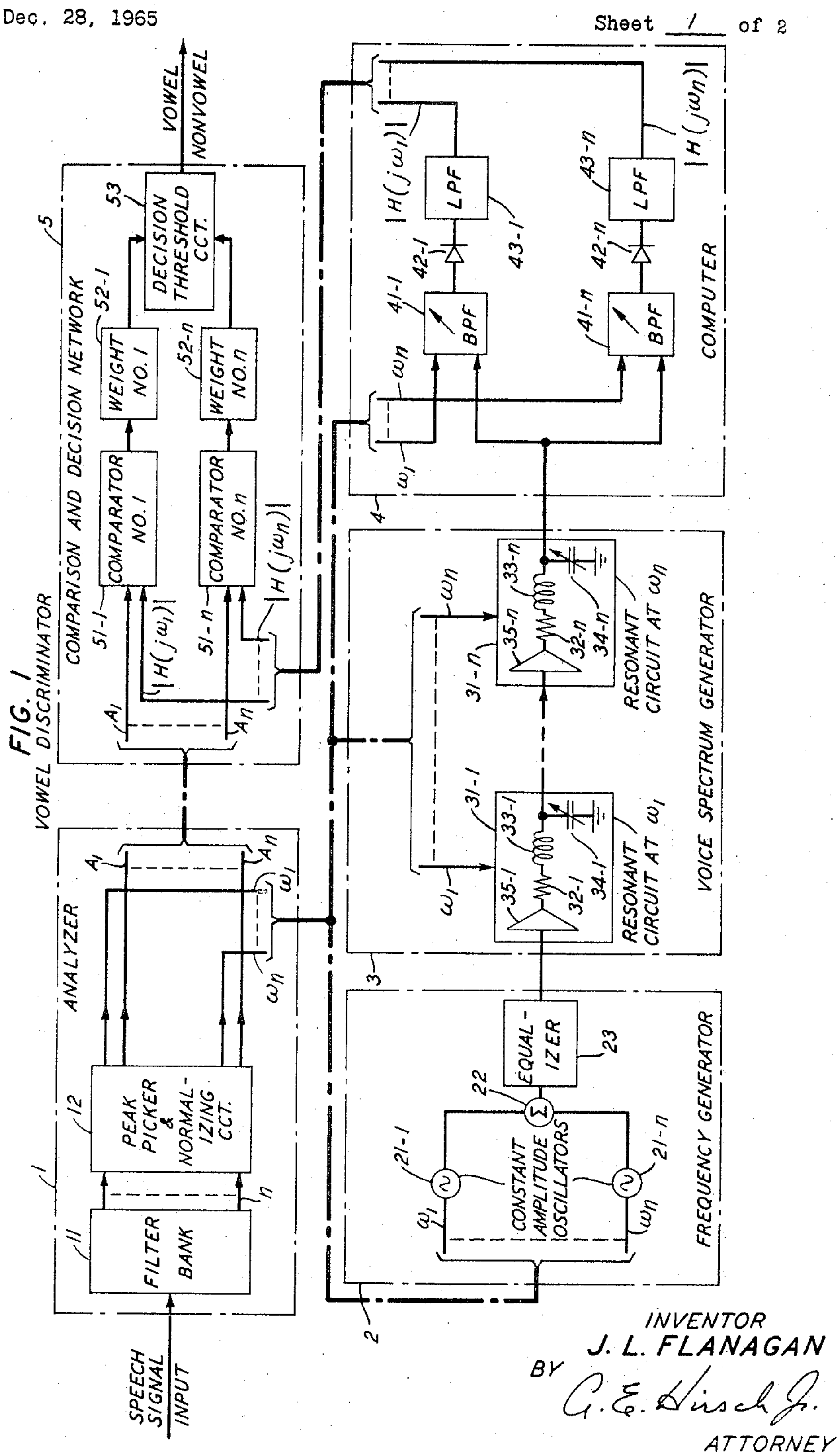

Turning now to FIG. 1, there is illustrated the preferred embodiment utilizing the principles of this invention. An incoming speech signal is applied to analyzer 1, in which the frequency spectrum of the speech signal is produced at selected short time intervals. From the spectrum there is determined both the frequency spectrum's formant amplitudes over the frequency range of interest and the formant frequencies corresponding to these amplitudes. A simulated set of vowel formant amplitudes is then synthesized at the measured formant frequencies by means of a precisely chosen model of the vocal tract consisting of frequency generator 2, spectrum generator 3, and computer 4 connected in tandem. The synthesized and measured formant amplitudes are compared in comparison and decision network 5 and a vowel is considered to be present if the differences between the corresponding simulated and measured formant amplitudes are within certain predetermined limits. When the sound is nonvowel, the first three synthesized formant amplitudes will differ from the measured formant amplitudes by more than the predetermined limits. Thus vowels and nonvowels can be easily distinguished.

In the speech analyzer 1, an applied speech signal is sent to a filter bank 11 consisting of a pluraity of bandpass filters arranged in parallel, where each filter is designed to pass a selected portion of the speech spectrum. The upper frequency limit of filter bank 11 is usually selected to allow the passage of the first three formants of every vowel spectrum. It is understood though that this upper frequency could be selected to allow the passage of any other desired number of formants. The output signal from each bandpass filter in the filter bank 11 is rectified and smoothed and applied to a peak picking and normalizing circuit 12 where the frequencies at which the local maximum amplitudes of the speech spectrum occur are determined. The peak picking circuit 12 also determines the relative magnitude of each of the local spectrum maxima. Combined filter bank and peak picking circuits of the type required for this invention are well known and could be similar to the circuits described by C. H. Coker in patent application Ser. No. 322,389, filed Nov. 8, 1963, now Patent No. 3,327,058, or to the circuit shown on page 144 of the above cited book.

Two sets of output signals are generated by peak picking and normalizing circuit 12. The first set of output signals is proportional to the first $n$ formant amplitudes; that is, to the amplitudes of the speech spectrum's first $n$ maxima where $n$ is a selected positive integer equal to the number of formants passed by filter bank 11. This first set of signals is stored in comparators 51 in comparison and decision network 5. The second set of output signals is proportional to the first $n$ formant frequencies. This second set of signals is utilized in several different ways.

First, these signals control the frequencies of $n$ constant amplitude sinusoidal signals generated in frequency generator 2. Frequency generator 2 therefore produces an output signal composed of $n$ sinusoidal constant amplitude components at the first $n$ formant frequencies by controlling the oscillation frequency of constant amplitude oscillators 21–1 through **21–*n*. The output signals from these $n$ oscillators are summed or mixed in summing network 22, attenuated approximately at the rate of minus six db per octave in equalizer 23 to compensate for the combined spectral characteristics of the glottal source and the mouth radiation impedance, and then used to drive $n$ resonant circuits 31–1 through 31–*n* in vowel spectrum generator 3**.

In their simplest form each of resonant circuits 31 consist of a series-connected unity gain isolation amplifier 35, resistance 32, inductance 33, and variable capacitor 34. The isolation amplifiers give the resonant circuits an infinite input impedance and thereby ensure that the transfer function for these resonance circuits connected in series is equivalent to the vocal tract transfer function given by Equation 1. The frequency of oscillation of each of these resonant circuits is controlled by varying the capacitance of the circuit as a function of a corresponding one of the second set of output signals from peak picking and normalizing circuit 12. These resonant circuits 31 are connected in series and each circuit is controlled to resonate at one of the formant frequencies; thus, the frequency spectrum of the output signal from the spectrum generator 3 is characterized by a line spectrum of $n$ components whose amplitudes represent the amplitudes of the $n$ formants of a synthetic vowel having formant frequencies equal to the values measured by analyzer 1.

The output signal from the spectrum generator 3 is sent to computer 4 which contains a filter bank consisting of parallel-connected variable frequency bandpass filters 41–1 through 41–n. Each filter's center frequency is controlled to match the formant frequency of a corresponding formant by one of the second set of output signals from circuit 12 in analyzer 1. Thus each variable frequency bandpass filter is set at one of the formant frequencies. The output signal from each variable frequency bandpass filter 41 is rectified by a corresponding diode 42 and sent to a corresponding low-pass filter 43, the output signal from which is proportional to the amplitude of the synthetic vowel formant at that frequency. This occurs because the transfer function for the series-connected resonance circuit is equivalent to the vocal tract's vowel transfer function as given in Equation 1. Thus the frequency spectrum envelope of the signal synthesized by the series-connected resonance circuit closely matches the frequency spectrum envelope of a vowel with the same formant frequencies.

Each synthesized vowel formant amplitude $|H(j\omega_i)|$ is compared in comparison and decision network 5 with the measured formant amplitude at the same frequency, where $i$ is an integer given by $1 \leq i \leq n$. There are $n$ comparators 51 to carry out this comparison and the output signal from each comparator 51 is proportional to the difference between the measured and calculated formant amplitudes. Normally, the comparison is made after amplitude normalization to eliminate differences in over-all intensity. That is, the synthesized amplitudes are scaled by a factor so that, for example, the synthetic first formant amplitude is equal to the corresponding measured amplitude. For this scaling factor, the amplitude differences between the other synthetic and measured formants are computed. The output signal from each comparator 51 is delivered to a corresponding weighting network 52 where the signal is weighted by a preselected amount. The weighting criterion can be any statistically meaningful criterion and in the simplest case the weighting is unity. The weighted output signals from the weighting network 52 are sent to decision threshold circuit 53 where they are compared to preselected threshold values. If the weighted signals are less than the corresponding threshold values, the output signal from the threshold circuit indicates the presence of a vowel. Otherwise, the circuit indicates the presence of a nonvowel.

Other embodiments incorporating the principles of this invention will be obvious to those skilled in the art. In particular, embodiments based on more sophisticated models of the vocal tract during the production of speech sounds will be apparent to acousticians and others skilled in speech analysis and synthesis.

What is claimed is:

1. Apparatus for distinguishing vowel from nonvowel sounds which comprises means for measuring a selected plurality of formant frequencies and amplitudes of a spoken sound, means for synthesizing an artificial vowel spectrum characterized by an envelope possessing maximum amplitudes at said formant frequencies, means for comparing said formant amplitudes with said maximum amplitudes to obtain signals proportional to the differences between said formant amplitudes and said maximum amplitudes, and means responsive to said signals for indicating the presence of a vowel for said differences less than a set of selected reference values, and for indicating the presence of a nonvowel for said differenecs which exceed said reference values.

2. In combination, means for measuring the amplitudes and frequencies of the first $n$ formants of a spoken sound, where $n$ is a selected positive integer, means for synthesizing an artificial vowel spectrum, the envelope of which possesses formants at said measured formant frequencies, and means for indicating the presence of a vowel during the times the differences between said measured and said synthesized formant amplitudes are less than selected reference differences.

3. Apparatus for indicating whether a sound is a vowel or nonvowel which comprises means for measuring the amplitudes and frequencies of selected maxima of the frequency spectrum of a sound, means for synthesizing the amplitudes of the vowel transfer function of a vocal tract at each of said measured frequencies, means for obtaining the differences between said synthesized and said measured amplitudes at the corresponding frequencies, and means for indicating the presence of a vowel during the times said differences are less than selected reference values.

4. Apparatus for synthesizing the formant amplitudes of a vowel sound which comprises, in combination, means for generating a signal containing $n$ predetermined frequency components, where $n$ is a selected positive integer, and where the frequencies of said $n$ predetermined frequency components correspond to the formant frequencies of a spoken sound, a plurality of $n$ series-connected resonating means driven by said signal, wherein each of said resonating means is controlled to resonate at one of the frequencies contained in said signal and wherein said plurality of $n$ series-connected resonating means has aproximately the same transfer function as a vocal tract during the production of a vowel, and a plurality of $n$ variable frequency filtering means arranged in parallel and connected to said resonating means, wherein each filtering means is designed to pass a selected one of said $n$ predetermined frequency components and wherein each of said filtering means produces an output signal with a magnitude proportional to one formant amplitude of a vowel.

5. Apparatus as claimed in claim 4 wherein said means for generating a signal comprises $n$ constant amplitude oscillators connected in parallel, each of which is controlled to produce an output signal with a frequency corresponding to one formant frequency of said spoken sound, and an equalizer for adjusting the amplitude of each of said output signals to compensate for the amplitude versus frequency characteristics of a glottal source and mouth radiation resistance.

6. Apparatus as claimed in claim 4 wherein each of said plurality of $n$ series-connected resonating means comprises the tandem connection of a unity gain isolation amplifier, a resistor and an inductor between an input and an output terminal and a variable capacitor shunting said output terminal to ground, the capacitance of said variable capacitor being controlled so that said resonating means resonates at one of the formant frequencies of said spoken sound.

7. Apparatus for distinguishing vowel from nonvowel sounds which comprises means for supplying an electrical signal representative of a speech sound, means for measuring the maximum amplitudes of the frequency spectrum of said electrical signal and the frequencies at which said maximum amplitudes occur, means for storing a record of each of said measured maximum amplitudes, means for generating a second signal containing a plurality of frequency components, each of which has a frequency corresponding uniquely to one of said measured frequencies and an amplitude adjusted to compensate for the frequency characteristics of a glottal source and radiation resistance of a mouth, a plurality of series-connected variable frequency resonant circuit means driven by said second signal and each tuned to a corresponding one of said measured frequencies for generating an output signal containing amplitude mavima at said measured frequencies, a plurality of variable frequency bandpass filter means arranged in parallel, each tuned to one of said measured frequencies thereby to pass selected bands of said output signal from said resonant circuit means, a plurality of rectifying means connected on a one-to-one basis to said plurality of variable frequency bandpass filter means, a plurality of low-pass filter means connected on a one-to-one basis to said plurality of rectifying means for developing output signals whose amplitudes are proportional to the amplitudes of the first *n* formants of a vowel sound, a plurality of comparator means for producing signals proportional to the differences between said measured maximum amplitudes and the output signals from said low-pass filter means at corresponding frequencies, a plurality of weighting circuit means corresponding on a one-to-one basis with said plurality of comparator means for weighting the signals from said comparator means by preselected amounts, and a threshold circuit for comparing the weighted signals from said weighting means with selected reference signals.

8. The method of determining the presence of a vowel which comprises analyzing the frequency spectrum of a sound to obtain measures of the amplitudes and frequencies of selected spectrum maxima, synthesizing the amplitudes of the vowel frequency spectrum at each of said measured frequencies, obtaining the differences between said synthesized amplitudes and said measured amplitudes at the corresponding frequencies, and indicating the presence of a vowel during the time said differences are less than corresponding selected values.

References Cited

UNITED STATES PATENTS

| | | |
|---|---|---|
| 3,322,898 | 5/1967 | Kalfaian. |
| 3,211,833 | 10/1965 | Warns. |
| 3,087,989 | 4/1963 | Nagata et al. |
| 3,042,748 | 7/1962 | Rosen. |
| 2,938,079 | 5/1960 | Flanagan. |
| 2,824,906 | 2/1958 | Miller. |

WILLIAM C. COOPER, *Primary Examiner.*

R. P. TAYLOR, *Assistant Examiner.*

U.S. Cl. X.R.

346—74; 178—6.06, 7.1, 69.5